J. H. HARDY.
HOSE COUPLING.
APPLICATION FILED SEPT. 7, 1909.
969,160.
Patented Sept. 6, 1910.
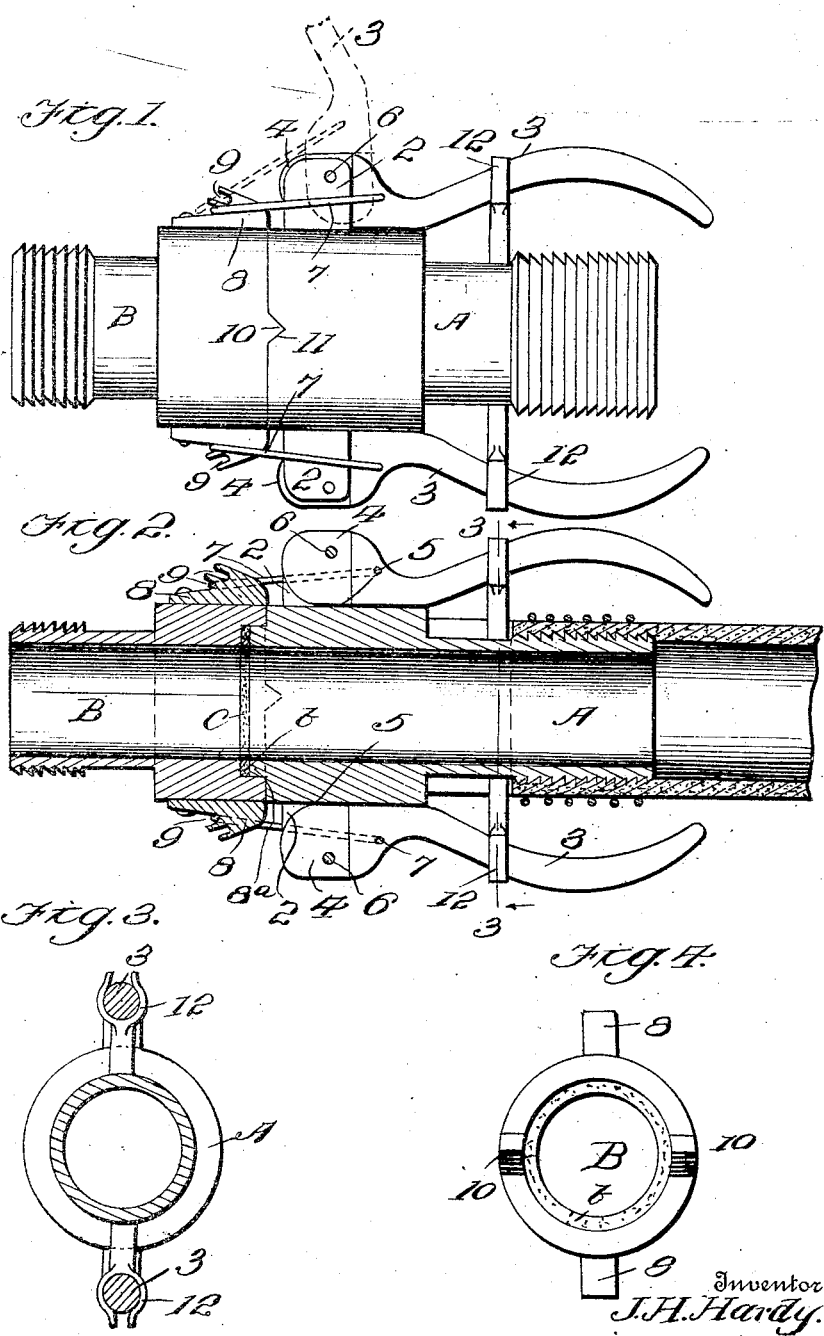

UNITED STATES PATENT OFFICE.

JOSEPH H. HARDY, OF IPSWICH, MASSACHUSETTS.

HOSE-COUPLING.

969,160.  Specification of Letters Patent.  Patented Sept. 6, 1910.

Application filed September 7, 1909. Serial No. 516,335.

*To all whom it may concern:*

Be it known that I, JOSEPH H. HARDY, citizen of the United States, residing at Ipswich, in the county of Essex and State of Massachusetts, have invented certain new and useful Improvements in Hose-Couplings, of which the following is a specification.

My invention relates to that class of hose couplings in which a male and female section are drawn together by means of eccentric clamps and the object of my invention is to provide a simple and effective coupling of this character which will admit of ready connection either to join two lengths of hose, or to connect a hose to a hydrant.

A further object is to provide a coupling in which one section of the hose may be advanced into engagement with the other section and both sections be kept in alinement with each other during the operation and while clamping the sections to each other, thereby making the couplings better capable of even adjustment while water is entering under considerable force through one of the coupling members, the water being directed in my coupling from one length of pipe directly into the other.

A still further object is to provide means on one of the couplings engaging with the other of the couplings, whereby the one coupling may be turned into proper position relatively to the other and without the necessity of seeing the couplings so that the operation may be performed in the darkest night by a mere sense of touch.

A further object is to provide clamps for this form of coupling which will not yield even under pressure but which are locked in their clamped position.

Another feature of my invention is the provision of an ear on one coupling with which the clamp on the other coupling engages, said ear being provided with a plurality of notches, thereby permitting of a varying adjustment of the two parts of the coupling in accordance with the thickness of the washer used between them.

For a full understanding of the invention and the merits thereof and also to acquire a knowledge of the details of construction and the means for effecting the result, reference is to be had to the following description and accompanying drawings, in which:

Figure 1 is a side elevation of my improved coupling; Fig. 2 is a longitudinal diametrical section; Fig. 3 is a view taken on the line 3—3 of Fig. 2; Fig. 4 is an end view of one of the coupling members.

Corresponding and like parts are referred to in the following description and indicated in all the views of the drawings by the same reference characters.

A designates one section of the pipe and B the other, the head of the pipe B being enlarged to receive the head of the pipe A, the pipe A being provided with a flange fitting into a socket $b$ in the other pipe. A washer C is interposed between the ends of the two lengths of pipe. The pipe A is provided at opposite portions of its diameter with the outwardly projecting spaced ears 2 between which are pivoted the clamp levers 3. The inner end of each lever 3 is formed with a head 4, the inside edge of said head being straight, as at 5. The pivot pin 6 which pivots the lever to the ears 2, passes through the outer margin of the head 4 and is therefore eccentric to said head. Both of the clamp levers 3 are constructed in the same manner and the heads 4 are alike. Freely mounted in the clamp levers at the margins of the heads are the bails 7.

The opposed coupling pipe is provided at opposite portions of its diameter with the projecting lugs 8, the inner ends of which are formed with a plurality of notches 9 with which the ends of the bails 7 are adapted to engage.

With the construction as above described, it will be obvious that when the two sections or opposed coupling pipes are placed together, the male end of one pipe engaging with the female end of the other pipe that a movement of the levers to a position at angles with the coupling pipes, will permit the bails 7 to engage with the notches 9 and that an inward turning of the levers to bring the levers in approximate parallelism with the coupling pipe A, will, by the eccentricity of the heads, cause the coupling pipe B to be drawn tightly against the coupling pipe A and the male end of one pipe to be forced firmly into the female end of the other pipe and to compress the packing ring C therein.

It will be seen that the coupling pipe A may be advanced directly in alinement with and against the end of the coupling pipe B and that the two pipes do not have to be first placed at angles with each other in order to permit the engagement between the bails and in order to permit the engagement between the coupling pipes, thereby a stream of water passing out of the pipe A will be directed into the central bore of the pipe B instead of being directed at an angle thereto and therefore partially out of the pipe B.

It will be seen also that diametrically opposite portions of the coupling pipes are held in engagement with each other and thus the coupling pipes resist the pressure of water equally on all sides. Furthermore, it will be seen that by providing a plurality of notches in the ears 8, the coupling pipe A may be drawn toward the pipe B an amount sufficient to correspond with the thickness of the washer C. After being used for some time in a hose coupling, the washers become compressed and hence the couplings must be tightened a little more than at first. The provision of a plurality of notches provides for this adjustment, and hence prevents undue leakage of water at the joints.

Another important feature of my invention, is the provision of means whereby the coupling pipes may be properly alined with each other so that the bails 7 will be in proper position to engage the ears 8 and so that this adjustment of the two couplings may be made even in complete darkness and by a mere sense of touch. To this end I provide one of the ends of the coupling pipes, as B, with the diametrically opposed projecting V-shaped teeth 10, and form the wall of the opposed coupling member at diametrically opposite points with the V-shaped notches 11 into which the teeth will fit. When either of these teeth are in alinement with either of the notches, the bails 7 will be in proper position to engage the ears 8. The importance of this will be evident where the coupling is being made in a hurry or in darkness, it being necessary to rotate one or the other of the coupling pipes until the teeth enter the notches, whereupon the bails may be turned inward over the ears 8 and the clamping levers retracted to draw one of the coupling pipes toward the other.

It has been stated that the inner edge of the head 4 is straight. This provides a flat contact between the straight edge 5 and the outer face of the coupling pipe to which the clamps are attached when the clamps are turned into their retracted position. As an additional means for holding the clamping levers in their retracted position and also preventing the clamping levers from being so violently retracted under the force of the water passing through the coupling members that the ends of the levers will strike the pipe and tend to crack it, I may provide upon each side of the pipe, opposed pairs of spring fingers 12. These spring fingers are turned inward toward each other and flared outwardly, thus when the lever is thrown inward it will be separated from the spring fingers 12 and thus pass below the contracted portion, said levers being held in a retracted position but prevented from violently striking the pipe.

The outward movement of the clamps is somewhat resisted by the eccentricity of the head and hence the clamps are held fairly firmly in the position shown in Fig. 2.

Another advantage due to the provision of my opposed coupling clamps and the construction I have devised, is that it directs the coupling members or pipes toward each other in coupling, and in alinement with each other as described. This permits the male end of one pipe section to be made large enough to fit the female end of the other section, thus there is no break between the sections, the coupling being relatively rigid so that no leakage can occur.

My invention is simple, may be cheaply made and is thoroughly effective in operation.

Having thus described the invention, what is claimed as new is:

1. A hose coupling consisting of opposed pipe sections, one having a socket and the other an end fitting in said socket, one of said sections being provided with opposed ears, the rear edge of each ear being provided with a plurality of notches, the other of said sections having opposed clamping levers pivoted thereon, each lever having an enlarged head pivoted at its outer margin to the pipe section, and an elongated bail freely pivoted to the head, rearward and inward of the pivotal point of the head, and adapted to engage over the corresponding notched lug of the other pipe section, the inner edge of said head being straight and adapted to engage along its entire extent with the face of the pipe section when the lever is turned into its retracted position.

2. A hose coupling consisting of opposed pipe sections, one having a socket and the other an end fitting in said socket, one of said sections being provided with opposed ears, the rear edge of each ear being provided with a plurality of notches, the other of said sections having opposed clamping levers pivoted thereon, each lever having an enlarged head pivoted at its outer margin to the pipe section, and an elongated bail freely pivoted to the head, rearward and inward of the pivotal point of the head, and adapted to engage over the corresponding notched lug of the other pipe section, the inner edge of said head being straight, and adapted to engage along its entire extent with the face of the pipe section when the lever is turned into its retracted position, the end of the clamping lever beyond the head being outwardly curved, and opposed clamping fingers located on the pipe section and adapted to resiliently clasp the levers when they are turned against the pipe.

3. A pipe coupling including two opposed coupling members, the adjacent ends of which are enlarged, one of said enlarged ends fitting in the other enlarged end, one of said members being provided with opposed ears provided with a plurality of notches, the other of said members being provided with opposed clamping levers, each clamping lever having an enlarged head pivoted at its outer margin to the pipe section, an elongated oval bail freely pivoted to the head rearward and inward of the pivotal point of the head and adapted to engage over the corresponding notched lug on the other pipe section, the inner edge of said head being straight and adapted to engage along its entire length with the face of the pipe section when the lever is turned into its retracted position, the end of each clamping lever beyond the head being outwardly curved and extending beyond the enlarged end of the coupling section, and clamping fingers projecting from the reduced portion of the coupling section and adapted to resiliently engage said clamping levers, when they are turned into their retracted position.

In testimony whereof I affix my signature in presence of two witnesses.

JOSEPH H. HARDY. [L. S.]

Witnesses:
CHESTER B. L. STEVENS,
ALBERT M. SHEPPARD.